(12) United States Patent
Gutzweiler et al.

(10) Patent No.: US 11,313,830 B2
(45) Date of Patent: Apr. 26, 2022

(54) ELECTROPHORETIC SEPARATION OF BIOMOLECULES

(71) Applicant: Albert-Ludwigs-Universitat Freiburg, Freiburg (DE)

(72) Inventors: Ludwig Gutzweiler, Freiburg (DE); Lutz Riegger, Freiburg (DE)

(73) Assignee: ALBERT-LUDWIGS-UNIVERSITAT FREIBURG, Freiburg (DE)

(*) Notice: Subject to any disclaimer, the term of this patent is extended or adjusted under 35 U.S.C. 154(b) by 160 days.

(21) Appl. No.: 16/635,643

(22) PCT Filed: Aug. 1, 2017

(86) PCT No.: PCT/EP2017/069456
§ 371 (c)(1),
(2) Date: Jan. 31, 2020

(87) PCT Pub. No.: WO2019/024990
PCT Pub. Date: Feb. 7, 2019

(65) Prior Publication Data
US 2021/0123886 A1    Apr. 29, 2021

(51) Int. Cl.
*G01N 27/447* (2006.01)
*G01N 27/453* (2006.01)

(52) U.S. Cl.
CPC . *G01N 27/44739* (2013.01); *G01N 27/44747* (2013.01); *G01N 27/44756* (2013.01); *G01N 27/44791* (2013.01)

(58) Field of Classification Search
CPC ........... G01N 27/447; G01N 27/44747; G01N 27/44756; G01N 27/453
See application file for complete search history.

(56) References Cited

U.S. PATENT DOCUMENTS

| | | | | |
|---|---|---|---|---|
| 4,006,069 A | * | 2/1977 | Hiratsuka | B01D 69/10 204/456 |
| 4,992,172 A | | 2/1991 | Pemawansa et al. | |

(Continued)

FOREIGN PATENT DOCUMENTS

| | | |
|---|---|---|
| GB | 2453256 A | 4/2009 |
| WO | 2001/055721 A2 | 8/2001 |

(Continued)

OTHER PUBLICATIONS

Int'l. Search Report for PCT/EP2017/069456, dated Oct. 6, 2017.

*Primary Examiner* — Alexander S Noguerola
(74) *Attorney, Agent, or Firm* — Blue Filament Law PLLC (57) ABSTRACT

An electrophoretic separation device includes an anode and a cathode, a porous scaffold material, and a liquid separation medium, wherein the separation medium is located inside the porous scaffold material, is in contact with the cathode and the anode, and has been applied to the porous scaffold material in form of a custom-made geometrical shape defining a migration path for a biomolecule-containing sample, wherein the sample is enclosed by the separation medium. A method for electrophoretic separation of biomolecules includes the electrophoretic separation device, a biomolecule-containing sample, wherein the sample is applied to the porous scaffold material prior to the application of the separation medium, or the sample is applied to the separation medium located inside the porous scaffold material, resulting in enclosure of the sample by the separation medium, and applying a voltage to the separation medium by means of the anode and the cathode leading to the migration of the biomolecules inside the separation medium.

20 Claims, 4 Drawing Sheets

(56) References Cited

U.S. PATENT DOCUMENTS

| | | | | |
|---|---|---|---|---|
| 5,384,025 A | * | 1/1995 | Biasband | G01N 27/44704 |
| | | | | 204/619 |
| 2003/0032201 A1 | | 2/2003 | Flesher | |
| 2005/0196702 A1 | | 9/2005 | Bryant et al. | |
| 2014/0332383 A1 | * | 11/2014 | Herr | G01N 27/44704 |
| | | | | 204/455 |

FOREIGN PATENT DOCUMENTS

| | | |
|---|---|---|
| WO | 2001/085830 A1 | 11/2001 |
| WO | 2002/048674 A2 | 6/2002 |

\* cited by examiner

Figure 4 a) Without applying an electric field b) After applying an electric field c)

ELECTROPHORETIC SEPARATION OF BIOMOLECULES

The invention relates to an electrophoretic separation device, comprising an anode and a cathode, a porous scaffold material, and a liquid separation medium, wherein the separation medium is located inside the porous scaffold material, is in contact with the cathode and the anode, and has been applied to the porous scaffold material in form of a custom-made geometrical shape defining a migration path for a biomolecule-containing sample, wherein the sample is enclosed by the separation medium. The invention further relates to a method for electrophoretic separation of biomolecules, comprising the electrophoretic separation device of the present invention, a biomolecule-containing sample, wherein the sample is applied to the porous scaffold material prior to the application of the separation medium, or the sample is applied to the separation medium located inside the porous scaffold material, resulting in enclosure of the sample by the separation medium, wherein the location of the sample within the geometrical shape of the separation medium can be freely chosen, and applying a voltage to the separation medium by means of the anode and the cathode leading to the migration of the biomolecules inside the separation medium.

BACKGROUND OF THE INVENTION

Blotting methods such as Southern, Western and Northern blotting are used for detection of specific biomolecules such as nucleic acids of specific sequences or proteins within a sample. The most important steps are the gel electrophoresis for separation of the biomolecules within a sample, the transfer of the biomolecules to a blotting membrane and subsequent detection of the biomolecules. A basic description of the method steps for a conventional Southern blot with individual steps can be found in T. A. Brown, Enzyclopedia of Life Sciences (2001).

In conventional blotting methods, the concentration of the sample to be analyzed has to be known or has to be determined before application of the sample in the respective blotting method. Due to the relative low sensitivity of these methods, the samples have to contain biomolecules in the p-gram range. The transfer or blotting of the biomolecules to the membrane usually occurs in the orthogonal direction of the migration path of the biomolecules in the gel during electrophoresis.

Such electrophoresis and blotting methods have several disadvantages. It takes a considerable amount of time of up to 2 days to carry out a blot in its conventional form. The performance of separation and membrane transfer can account for more than 50% of the required total time. So called mini-gels and precast gels have been developed to minimize the time for preparation of separation gels. Also, specific blotting systems have been developed to accelerate the transfer of the biomolecules form the gel to the blotting membrane. However, these developments only accelerate individual steps of the process. Also, the problem that samples with low concentrations are difficult to analyze remains unsolved by such technical solutions.

Furthermore, the blotting process, which induces migration of the molecules in the orthogonal direction in comparison to the migration path during electrophoresis, is often associated with incomplete transfer, which can be caused by air bubbles present between the membrane and the gel, loss of molecules that migrate through the blotting membrane and worsening of separation resolution due to smearing of the transferred molecules.

Microfluidic electrophoresis technologies have been developed to overcome some of these limitations. A microfluidic western blot technology has been described by A. J. Hughes (PNAS, pages 21450-21455, Dec. 26, 2012). However, this system represents a closed microfluidic system and does not involve the binding or immobilization of the biomolecules to a membrane, resulting in limited analysis and detection options. Furthermore, the use of a premade, structured microfluidic chip represents a restriction, since a custom-made design of the migration path within the microfluidic device is not possible. Additionally, the manufacturing of such chips leads to relatively high costs.

Therefore, there is a high demand for developing microfluidic methods and devices that accelerate and improve the separation of the components of biomolecule-containing samples by electrophoresis and the binding of the separated biomolecules to the separation medium or preferably a membrane. Furthermore, the sensitivity of detecting molecules that are present only in low quantities has to be enhanced as compared to known methods to allow analysis of low amounts of sample components. Furthermore, there is a need for custom-made electrophoretic devices, which allow the design of specifically shaped migration paths within the electrophoretic device.

SUMMARY OF THE INVENTION

In light of the prior art the technical problem underlying the present invention is to provide improved electrophoretic devices and methods for electrophoretic separation of biomolecules that overcome the limitations and disadvantages of the state of the art and allow a faster separation of components of a biomolecule-containing sample and binding to the separation medium or membrane, increased sensitivity of detection and the provision of custom-made migration path for a sample.

This problem is solved by the features of the independent claims. Preferred embodiments of the present invention are provided by the dependent claims.

The invention therefore relates to an electrophoretic separation device, comprising
  an anode and a cathode,
  a porous scaffold material, and
  a liquid separation medium, wherein the separation medium
    i. is located inside the porous scaffold material,
    ii. is in contact with the cathode and the anode, and
    iii. has been applied to the porous scaffold material in form of a custom-made geometrical shape defining a migration path for a biomolecule-containing sample, wherein the sample is enclosed by the separation medium.

The electrophoretic separation device of the present invention allows the separation of components of a biomolecule-containing sample within the liquid separation medium. The liquid separation medium is located inside the porous scaffold material. This means that the porous scaffold material is surrounding the liquid separation medium, which resides in the pores or hollow spaces or cavities of the porous scaffold material.

The device comprises an anode and a cathode, which are both in contact with the liquid separation medium. "Being in contact" in the sense of the present invention means that the liquid separation medium is electrically connected with the anode and the cathode, respectively, so that an electrical field can be applied to the liquid separation medium over the respective contact points. This allows the application of a voltage between the anode and the cathode within the liquid separation medium, leading to the formation of an electrical field and the migration and eventually separation of the components comprised in a sample that is enclosed by the liquid separation medium. The separation of the components can occur due to their size, molecular weight, charge, and/or isoelectric point (pl, pH(I), IEP).

In preferred embodiments the present invention comprises more than one anode and more than one cathode. For example, the device of the present invention can comprise two anodes and two cathodes enabling parallel analysis of two samples in independent separation channels that are connected to different electrodes.

Since the sample is enclosed by the liquid separation medium, which is located inside the porous scaffold material, it is possible to immobilize the components of the sample on or in the scaffold without having to transfer the components of the sample from the separation medium onto the scaffold material, as it is necessary in conventional electrophoresis and blotting methods. This leads to a much faster and more efficient process, since the two time-consuming processes of separation by electrophoresis and blotting have been combined in a single step by positioning the liquid separation medium inside the porous scaffold material. In preferred embodiments of the present invention the processes of preparing the device of the present invention, separating the components of the biomolecule-containing sample by electrophoresis and binding the biomolecules to be analyzed to the porous scaffold medium or the liquid separation medium takes less than 10 minutes.

Through this surprising placement of the separation medium inside the porous scaffold material of the device of the present invention, many manual process steps necessary in conventional electrophoresis and blotting procedures are spared. Furthermore, the process can be at least partially automated and does not require manual intervention. Since the method does not involve a blotting step that requires migration of the separated components of the sample in the orthogonal direction of the migration direction, there is no risk of losing separation resolution. Smearing of the components during the blotting or transfer process cannot occur. Also, there is no risk of losing sample material from transmigration through the blotting membrane, as in conventional blotting methods.

The device of the present invention allows the design of custom-made migration paths that are located inside the porous scaffold material. The term "custom-made geometrical shape" in the sense of the present invention relates to the area or space of the porous scaffold material that is covered by the liquid separation medium. The liquid separation medium is held in the specific place or location within the porous scaffold material, where it has been initially applied due to capillary forces (capillary action), which results from intermolecular forces between the liquid separation medium and the surrounding solid surfaces, surface tension forces, cohesive forces and/or adhesive forces. Such forces ensure the stability of the geometrical shape of the liquid separation medium within the porous scaffold material. Due to the capillary forces that retain the liquid separation medium in its specific position within the porous scaffold material, the user can design the location and shape of the liquid separation medium within the porous scaffold material freely according to the requirements of the intended analysis or experiment, thereby allowing the on-demand design of the shape of the liquid separation medium within the porous scaffold.

The migration path for the components of the sample is defined by the geometrical shape of the liquid separation medium between the contact points of the separation medium with the anode and the cathode, respectively. The term "migration path" refers to the separation channel formed by the liquid separation medium. The components of the sample migrate along the migration path of the liquid separation medium along the direction of the force that is applied to them by means of the electrical field.

"Enclosure" of the sample by the separation medium in the sense of the invention refers to the sample being surrounded by the separation medium within the porous scaffold material. Enclosure of the sample by the liquid separation medium also comprises a state, for example, in which the sample is located at the bottom of the porous scaffold material, wherein the scaffold material can be placed onto a solid support, and the sample is therefore surrounded by liquid separation medium and the solid support within the porous scaffold.

A biomolecule-containing sample in the sense of the present invention can be any kind of sample, which comprises biomolecules. The sample can be liquid, semi-solid, in gel-form or solid. Examples of samples according to the present invention comprise, but are not limited to cell lysates, tissue homogenates, liquids containing biomolecules, wherein the biomolecules can be, for example, in solution or coupled to solid beads.

Biomolecules in the sense of the present invention comprise, but are not limited to, nucleic acids, proteins, enzymes, peptides, antibodies, sugar molecules, lipids and combinations thereof, such as, for example, glycosylated proteins or other glycosylated biomolecules.

Nucleic acids in the context of the present invention comprise, without limitation, DNA, RNA, PNA, ssDNA, dsDNA, RNA, mRNA, tRNA, lncRNA, ncRNA, microRNA, siRNA, rRNA, sgRNA, piRNA, rmRNA, snRNA, snoRNA, scaRNA, gRNA, viral RNA, modified RNA, such as for example LNA. Oligonucleotides in the sense of the present invention are relatively short nucleic acid molecules of about 200 nucleotides in length.

Sugar molecules in the sense of the present invention comprise carbohydrates or saccharides, including mono-, di-, oligo- and polysaccharides. The term glycosylation describes enzymatic and chemical reactions leading to the binding of a sugar molecule to a protein, a lipid or other molecules, wherein the glycosylated product molecules are called glycosides, including glycoproteins, peptidoglycans and glycolipids.

In the context of the present invention, lipids are hydrophobic molecules that are partially or completely insoluble in water and, due to their low polarity, dissolve in lipophilic or hydrophobic solvents. Lipids are important structural components of cell membranes, are used as energy source in living organisms and have functions in signal transduction. Lipids comprise, without limitation, fatty acids, fats, waxes, sterols, fat-soluble vitamins (such as vitamins A, D, E, and K), monoglycerides, diglycerides, triglycerides, phospholipids, sphingolipids, lipopolysaccharides and isoprenoids (terpenoids).

In preferred embodiments the separation of the components of the sample, such as different biomolecules, occurs during the migration through the liquid separation medium due to specific properties of the respective biomolecules comprising, but not being limited to, the electrical properties, the isoelectric point, the size, morphological structure, the molecular weight. Additionally, the separation can be influence by the pore size, the electrical and fluidic properties (e.g. conductivity, viscosity, surface tension and contact angle) of the liquid separation medium as well as of the porous scaffold material. Furthermore the separation is influenced by combined effects like molecular interactions between biomolecules and the liquid separation medium and/or the porous scaffold.

In preferred embodiments of the invention it is possible that only parts of the porous scaffold material are wetted with the liquid separation medium. This means that only parts of the porous scaffold material is filled or covered with the liquid separation medium, whereas other parts of the porous scaffold remain empty or dry. In this context, empty or dry means that in these parts the hollow spaces or the pores of the porous material are not filled with liquid separation medium. In other preferred embodiments of the invention the porous scaffold material is completely filled with liquid separation medium.

Preferred embodiments of the present invention do not require hydrophobic boundaries or boundary surfaces for ensuring the stability of the geometrical shape of the liquid separation medium within the porous scaffold material. In other preferred embodiments the present invention comprises hydrophobic boundaries to stabilize the geometrical shape of the liquid separation medium within the porous scaffold material.

In a preferred embodiment of the present invention the liquid separation medium is a liquid or a gel, selected from the group comprising liquid or solid polyacrylamide based gels, agarose based gels, hydrogels, gradient gels and buffer solutions.

The term "liquid separation medium" in the sense of the present invention relates to any kind of water based aqueous solution or gels requiring water or other liquids like inorganic or organic solvents or additives like DMSO, DMF or glycerol for their preparation. Examples of liquid separation media according to the present invention comprise, without limitation, water-based gels, buffers, salt solutions, liquid gels, solid gels, liquid or solid polyacrylamide based gels, linear or crosslinked polyacrylamide based gels, agarose based gels, hydrogels, such as alginate, pluronic, gelatin or chitin hydrogels, gradient gels and buffer solutions as well as blends of the aforementioned gel types. Furthermore, the liquid separation medium can form a separation channel, which can comprise more than one liquid or gel. For example, the separation channel formed by the liquid separation medium can be assembled of different portions of different liquid or gel types. For example, a separation channel can comprise a portion formed by polyacrylamide, which is connected to a portion formed by agarose.

It is a great advantage of the present invention that all kinds of liquids and gels that have electric conductivity are suitable to serve as liquid separation media. It was surprising that in preferred embodiments of the present invention liquids that do not comprise gel-like structures can serve as liquid separation medium, which maintains the custom-made, user-designed geometrical shape inside the porous scaffold without requiring hydrophobic boundaries due to the capillary forces acting between the medium and the scaffold material. With respect to embodiments of the invention that comprise a gel as liquid separation medium it was surprising that the gel easily penetrates the porous scaffold material.

In preferred embodiments of the present invention, the separation medium forms a separation channel having a width of 25 to 1000 µm, preferably 30 to 500 µm, more preferably 50 to 250 µm, most preferably 125 µm.

The width of the separation channel is measured in the orthogonal direction to the migration path of the sample components and within the plane of the porous scaffold material, which is two-dimensional in preferred embodiments of the invention. The small width of the separation channel correlates with a small area-cross section. A small width within the µm-range is particularly advantageous, because it is possible to generate high electric fields resulting in fast separation and high migration speed of the sample components while applying a relatively low electrical current whereby heat generation is reduced that otherwise adversely contributes to separation performance.

Furthermore, the small scale of the separation channel reduces the amount of separation medium required for the assembly of the device of the present invention and therefore reduces material costs. It is further associated with a reduction of the amounts of all other materials involved. Due to the small scale of the separation channel it is possible to drastically reduce the volume of the sample which is enclosed in the separation medium. This leads to an increased separation accuracy and resolution. Also, the sensitivity of the sample detection is substantially increased.

In a preferred embodiment of the present invention the channel has a width of about 25 to 1000 µm. This embodiment is particularly advantageous since it is possible to adjust the width of the channel to the kind sample and to the volume of the sample that should be analyzed and gives the freedom to analyze extremely small sample volumes as well as relatively large volumes that require a larger diameter of the separation channel. Furthermore, a separation channel in this range can be applied to the scaffold material without sophisticated equipment, for example by means of a pipette and is less susceptible to evaporation.

In another preferred embodiment of the invention the channel has a width of about 30 to 500 µm. This embodiment is particularly advantageous since the advantages of the small scale are even more pronounced. Another advantage is that process automation for the generation of lines exhibiting widths up to 500 µm is most feasible with respect to costs of the required components. Furthermore, a migration path within this scale can still be observed by eye, since the resolution of the human can distinguish between structures in the range of 200 to 400 µm. This allows optical control of the separation channel during the manufacturing process without needing sophisticated equipment.

In another preferred embodiment of the invention the channel has a width of about 50 to 250 µm. This embodiment is particularly advantageous since in addition to the advantages of the small scale (including high separation resolution, fast separation, higher detection sensitivity and application and detection of small sample volumes) it is possible to apply the separation medium with a device that allows the generation of a line of liquid separation medium in the range of about 50 to 250 µm onto the porous scaffold without requiring a specific dispenser, (tube-)nozzle or a syringe pump that can generate extremely thin lines of less than 50 µm either by drop-on-demand printing or direct writing methods or pressure driven methods.

In a particularly preferred embodiment of the invention the channel has a width of about 125 µm. This channel width is particularly advantageous since it represents the optimal width enabling the advantages of the small scale, while allowing the application of various sample volumes ranging from the pico-liter to the micro-liter scale as well as an easy manufacturing process.

In a preferred embodiment of the present invention the separation medium forms fluid reservoirs at the contact points with the anode and the cathode.

The term "reservoir" refers to an extension or expansion or dilatation of the separation medium at the contact points with the anode and the cathode. Such reservoirs are particularly advantageous since they give flexibility when placing the porous scaffold comprising the liquid separation medium onto the anode and the cathode or vice versa. Due to the small scale of the separation channel it would otherwise be difficult to make sure that the separation medium, which can be applied to the scaffold in such thin lines, is in contact with the anode and the cathode. Furthermore the large contact area realized by reservoirs between the electrodes and the separation medium prevents heat generation and thus the formation of gas bubbles that may cause current instabilities. Additionally the reservoir supplies an increased amount of charge carriers to keep the current stable and thus migration velocity constant. The reservoirs can have a scale that can be seen by eye so that the user knows how to place either the scaffold comprising the liquid separation medium relative to the electrodes or vice versa. Similarly, when the separation medium is added to the scaffold only after the scaffold has been placed onto the anode and the cathode, it is useful to apply a reservoir of separation medium over the anode and the cathode to make sure an efficient contact point is generated. The reservoirs at the contact points can subsequently be connected by fine structures of separation medium, such as thin lines or meanders.

In preferred embodiments of the present invention the geometrical shape of the separation medium forms complex structures, preferably selected from the group comprising circles, squares, ellipses, crossing T-structures, Y-structures, meanders, channels with increasing widths and combinations thereof. T- and Y-structures enable the transfer of the electrokinetic injection principle used in chip-based electrophoresis to this invention as well as they offer the possibility for subsequent injections of different samples or analytes into the same channel. Larger structures like squares, circles and ellipses are advantageous as they serve as fluidic barriers or restrictions to prevent pressure driven flows induced between unbalanced reservoirs that are connected by a fluidic line. Within lines with increasing widths the current density continuously decreases and thereby decelerates the biomolecules. By this continuous deceleration the sample becomes focused which improves the separation performance.

In certain preferred embodiments it is also possible to apply different and/or separated shapes of liquid separation medium to the scaffold, which allows parallel analysis of different samples in separated migration paths, which can have different shapes.

In specific embodiments of the present invention the porous scaffold material has a pore diameter of about 0.05 to 1 µm. This embodiment is particularly advantageous because this range of pore sizes allows to use scaffolds of irregular structures with varying pore sizes. Also, the pore size allows the stabilization of the geometrical shape of the liquid medium without influencing the migration of soluble biomolecules through the separation medium. However, it is possible to influence the migration of biomolecules that are coupled to solid beads contained in a sample.

In specific embodiments of the present invention the porous scaffold material has a pore diameter of about 0.1 to 0.5 µm. This range of pore size additionally ensures a homogenous structure of the scaffold material that allows constant and continuous migration of the sample components within the separation medium that is located inside the scaffold material.

In specific embodiments of the present invention the porous scaffold material has a pore diameter of about 0.2 µm. Besides the advantages recited above for the broader ranges of pore diameters, the pore size of about 0.2 µm ensure optimal stabilization of the liquid separation medium within the porous scaffold material. This particular pore size ensures a high capillary force that enables the design and stabilization of delicate and sophisticated geometrical shapes having a width of only a few micrometers, which are formed by the liquid separation medium inside the porous scaffold.

According to another preferred embodiment of the present invention, the porous scaffold material is two-dimensional and has a thickness of about 10 to 2000 µm, preferably about 50 to 1000 µm, more preferably about 100 to 400 µm, most preferably about 200 µm.

The term two-dimensional refers to a plane shape of the porous scaffold material. In a preferred embodiment the porous scaffold material is a membrane. The thickness of the membrane or scaffold material defines the maximum height of the separation channel in the device of the present invention. Therefore the thickness can have an important influence on the cross-sectional diameter of the separation channel.

The thickness of about 10 to 1000 µm is particularly advantageous since it is possible to adjust the height of the separation channel to the kind and volume of the sample that should be analyzed. Furthermore, it provides the flexibility to analyze extremely small sample volumes as well as relatively large volumes that require a larger diameter of the separation channel.

The thickness of about 50 to 1000 µm is particularly advantageous since the advantages of the small scale diameter of the separation channel are even more pronounced. Furthermore, extremely thin membranes below 50 µm are very fragile and can easily break during the application of the separation medium or other handling steps.

The thickness of about 100 to 400 µm is particularly advantageous since in addition to the advantages of the small scale (including high separation resolution, fast separation, higher detection sensitivity and application and detection of small sample volumes) it enables high stability of the geometrical shapes of liquid separation medium inside the porous scaffold material.

The thickness of about 200 µm is particularly advantageous since it represents the optimal height of a separation channel enabling the advantages of the small scale, the application of various sample volumes ranging from the pico-liter to the micro-liter scale, and an easy manufacturing process due to the stability of the porous membrane (scaffold material). Furthermore the smaller height facilitates detection of the biomolecules since in case of non-transparent thicker membranes only a part of the analyte or sample will be detected and quantitatively measured.

In a particularly preferred embodiment of the invention the porous scaffold material or the separation medium exhibits a binding capacity for the sample or components of the sample.

In particular, the binding capacity can be directed against the component of the sample to be analyzed. For example, in the case of analyzing DNA contained in a sample, the scaffold material or the separation medium can exhibit a binding capacity for DNA. The same principle applies for the analysis of other nucleic acids, proteins, sugar, lipids or other biomolecules or combinations thereof. Furthermore, the binding capacity can be directed towards solid beads that are comprised in the sample. Such beads can have specific binding properties, for example through coating with specific molecules or chemical groups.

In a preferred embodiment of the invention the porous scaffold material exhibits a binding capacity for the sample or components of the sample. When a voltage is applied to the separation medium and the enclosed sample, migration of the sample components is still possible since the force applied by means of an electrical field can be higher that the binding force between the scaffold and the sample component.

In a preferred embodiment of the invention the liquid separation medium exhibits a binding capacity for the sample or components of the sample. When a voltage is applied to the separation medium and the enclosed sample, migration of the sample components is still possible since the force applied by means of an electrical field can be higher than the binding force between the separation medium and the sample component.

In a preferred embodiment of the invention the liquid separation medium exhibits a binding capacity for the sample or components of the sample and/or a binding capacity for the scaffold material. If the liquid separation medium exhibits a binding capacity for the sample or components of the sample and a binding capacity for the scaffold material the sample or components of the sample are bound to the scaffold material through the separation medium. When a voltage is applied to the separation medium and the enclosed sample, migration of the sample components is still possible since the force applied by means of an electrical field can be higher than the binding force between the separation medium and the sample component.

In a preferred embodiment of the invention the porous scaffold material exhibits a binding capacity for the liquid separation medium and the liquid separation medium exhibits a binding capacity for the sample or components of the sample.

In a particularly preferred embodiment of the invention the binding capacity is activated upon application of a binding stimulus. In the context of the present invention, binding stimuli comprise, without limitation, heat, UV- (ultraviolet), IR- (infrared) or any other optical radiation, electrostatic interaction, biological binding, magnetic interactions, adhesion and chemical modifications through activation of chemical reactions. It is particularly advantageous that by means of such a stimulus sample components can be bound to the scaffold material or separation medium or even both at a chosen time point before, during and/or after separation.

In a preferred embodiment of the invention it is advantageous to bind specific biomolecules to a certain position within the porous scaffold before injecting the sample and/or applying the separation medium to the porous scaffold since the specific biomolecule species can interact with or bind to the "pre-bound" biomolecules during electrophoretic migration.

According to a preferred embodiment of the present invention the porous scaffold material is Polyvinylidene Difluoride (PVDF), nylon or nitrocellulose.

The use of PVDF in the context of the present invention is particularly advantageous because PVDF membranes offer high mechanical strength and allow for re-probing and storage. Furthermore, PVDF membranes have a high binding capacity for biomolecules and specifically proteins. Furthermore PVDF is hydrophobic and is therefore suitable for the analysis of hydrophobic biomolecules.

The use of nitrocellulose as a porous scaffold material in the sense of the present invention is advantageous because it has a high affinity for biomolecules, in particular proteins, and therefore has a high retention capacity. Moreover, it is a relatively cheap material. Also, nitrocellulose is easily wetted and therefore the use of methanol is not required.

The use of nylon membranes according to the present invention is advantageous because such membranes have a high mechanical strength compared to other membrane materials. Also, the mechanism of biomolecule-binding to the membrane is by electrostatic interaction and the binding capacity of nylon membranes is high. Furthermore, multiple probing, for example using antibodies, is possible. Also, nucleic acids can be covalently linked to nylon membranes through controlled exposure to UV light (UV cross-linking).

The use of charged nitrocellulose and nylon membranes in the context of the present invention is advantageous because due to the charge of these membranes they enable initial binding of oppositely charged biomolecules.

Further possible materials that can serve as porous scaffold material according to the present invention comprise, but are not limited to, glass fiber membranes, polymers, ceramics, such as aluminum-oxide, polysulfone, polyethersulfon (PES) cellulose, cellulose-esters such as cellulose acetate or cellulose nitrate, regenerated cellulose (RC), silicone, polyamide/nylon (for example, PA 6, PA 6.6, PA 6.10, PA 6.12, PA 11, PA 12), polyamidimide, polyamid urea, polycarbonate, ceramic, steel, silver, silicon, zeolithe (alumosilicate), polyacrylnitrile (PAN), polyethylene (PE), polypropylene (PP), polytetrafluorethylene (PTFE), polyvinylchloride (PVC) and polypiperazinamide.

In a preferred embodiment of the present invention the porous scaffold material is placed on a base substrate comprising the anode and the cathode. In a preferred embodiment the substrate is planar. The substrate may be made of any desired material, like glass, silicon, plastic, ceramic, semiconductor or the like.

The anode and the cathode of the present invention can be provided by the substrate, for example in form of plane or flat electrodes that are part of the planar substrate. After placing the porous scaffold material onto the planar substrate comprising the anode and the cathode, the liquid separation medium can be added, for example in form of reservoirs, at the location of the anode and the cathode below the porous scaffold material, bringing the liquid separation medium in contact with the anode and the cathode. Alternatively, the liquid separation medium can already be located inside the porous scaffold material when the scaffold material is placed onto the planar support. In this case, the porous scaffold material can be placed in a way that the liquid separation medium is in contact with the cathode and the anode. This embodiment is particularly advantageous because any kind of porous scaffold material can be chosen and can be placed onto a support comprising the anode and the cathode.

In a preferred embodiment of the invention the separation medium within the porous scaffold is electrically contacted from the top via rod- or pin-electrodes serving as anode or cathode, for example through immersion of the electrodes into the reservoirs, after generating the fluidic separation systems. The advantage of this method is that no modification of base substrate or porous scaffold is required. Such electrodes can be mounted to a frame that is placed above or around the porous scaffold or they can be mounted to a processing device in terms of automatization.

In another preferred embodiment of the present invention the porous scaffold material comprises the anode and the cathode. In this case the anode and the cathode have been integrated into the porous scaffold material and the liquid separation medium can be applied to the location of the anode and the cathode within the scaffold material when assembling the device of the present invention. This embodiment is particularly advantageous because the scaffold material is already assembled with the anode and the cathode and does not require further assembly steps.

The present invention further relates to a method for manufacturing the electrophoretic separation device of the present invention, wherein the separation medium is applied onto the surface of the porous scaffold material in a geometrical shape defining a migration path for a sample and penetrates the porous scaffold material. Penetration of the porous scaffold material refers to the migration of the liquid separation medium from the surface of the scaffold material into the hollow spaces or pores, resulting in the liquid separation medium being located inside the porous scaffold material.

In a particularly preferred embodiment of the invention, the liquid separation medium that is placed onto the surface and is subsequently drawn into the porous scaffold material through capillary forces. Alternatively, the liquid separation medium can be drawn into the porous scaffold material through a vacuum that is applied to the scaffold material below the area that has been covered with liquid separation medium, or the migration of the liquid separation medium into the porous scaffold medium is mediated by centrifugal forces.

In a preferred embodiment of the invention the separation medium is applied onto the surface of the porous scaffold material through semi-contact writing, non-contact dispensing or contact dispensing. In another preferred embodiment the separation medium is applied onto the surface of the porous scaffold material through syringe or peristaltic pumps.

A great advantage of using these methods in the context of the present invention is that the liquid separation medium can be applied to the membrane in the required user-defined geometrical shape in an automated, software-assisted manner.

The application of the liquid separation medium in the context of the present invention can be carried out by dispensing a single or several drops by means of a picoliter or nanoliter dispenser. All instruments required for structuring, injection, overload, detection and voltage application can be installed on a three-axis system and can be controlled automatically. The implementation of the desired geometry can also be software-based and automated. The only manual steps may be the filling of the dispensers and the placing of the substrate and porous scaffold.

Semi-contact writing refers to another preferred method of the invention for applying the liquid separation medium onto the porous scaffold material (Gutzweiler et al. J. Micromech. Microeng. 26 (2016) 045018 (10pp)). Therefore, a nozzle is moved close to the surface of the porous scaffold material and a capillary bridge is formed between the scaffold material and the nozzle. Due to the capillary flow, a fluidic line or any other geometrical shape can be generated by the controlled movement of the porous scaffold material or of the nozzle. The use of semi-contact writing in the method of the invention is particularly advantageous because it facilitates the on-demand application of the liquid separation medium and is therefore ideally suited for rapid design of user-defined geometrical shapes. Furthermore, it enables structure widths of down to 100 μm and controllable structure heights ranging from 5.5 μm for writing single layers up to 100 μm by stacking. As a unique property, freely selectable height variations across a substrate can be achieved by application of local stacking. Also, the nozzle does not get into contact with the scaffold material and therefore the risk of contaminating the nozzle or the separation medium ejected from the nozzle with components present on the scaffold, for example previously applied samples, is extremely low.

Non-contact dispensing relates to a method for producing liquid media dosages in volumes of usually less than one microliter, wherein a drop forms at the end of a nozzle, but far enough away from the target area on the scaffold material so that the drop separates from the nozzle before it hits the surface of the scaffold material. A fluidic line or any other geometrical shape can be generated by the controlled movement of the porous scaffold material or of the nozzle while continuously dispensing the liquid. The use of non-contact dispensing for the manufacturing of a device of the present invention is particularly advantageous, because the method is very fast and allows the application of sophisticated shapes of the liquid separation medium to the scaffold material in a short time. Furthermore, there is no contact and no bridge formation between the scaffold material and the nozzle. Therefore, there is almost no risk of contaminating the liquid separation medium with substances that are present on the scaffold material.

Contact dispensing refers to method, in which a drop forms at the exit of a nozzle or a small tip, and is deposited by contact, while the drop is still on the nozzle or tip. A fluidic line or any other geometrical shape can be generated by the controlled movement of the porous scaffold material or of the nozzle. The use of contact dispensing in the method of the present invention is particularly advantageous because it allows a very accurate and precise dispensing of extremely thin and sophisticated structures without stressing the dispensed liquid separation medium.

The present invention further relates to a method for electrophoretic separation of biomolecules, comprising
   providing an electrophoretic separation device, comprising
     an anode and a cathode,
     a porous scaffold material, and
     a liquid separation medium, wherein the separation medium
     i. is located inside the porous scaffold material,
     ii. is in contact with the cathode and the anode, and
     iii. has been applied to the porous scaffold material in form of a custom-made geometrical shape defining a migration path for a sample, wherein the sample is enclosed by the separation medium, and
   a biomolecule-containing sample, wherein
     the sample is applied to the porous scaffold material prior to the application of the separation medium, or
     the sample is applied to the separation medium located inside the porous scaffold material,
       resulting in enclosure of the sample by the separation medium, wherein the location of the sample within the geometrical shape of the separation medium can be freely chosen,
   applying a voltage to the separation medium by means of the anode and the cathode leading to the migration of the biomolecules inside the separation medium.

According to the method for electrophoretic separation of biomolecules of the present invention, a sample can be applied to the porous scaffold material prior to the application of the liquid separation medium or after the application liquid separation medium. In both cases the sample will be enclosed or surrounded by the geometrical shape of the separation medium located inside the porous scaffold material after the sample and the liquid separation medium have been applied to the porous scaffold material.

In one embodiment of the present invention application of the sample to the porous scaffold material relates to the application of the sample to the surface of the porous scaffold material and the subsequent penetration of the sample into the pores of the scaffold material by means of, for example, capillary forces, vacuum, pressurization or centrifugal forces, wherein the liquid separation medium can already be located within the porous scaffold material or will be applied after the application of the sample.

In another embodiment of the invention, application of the sample to the porous scaffold material relates to the injection of the sample into the porous scaffold material, wherein injection can be carried out in the way that the tip or nozzle of the instrument used for injection penetrates the porous scaffold material. In this context, the liquid separation medium can already be located within the porous scaffold material or will be applied after the injection of the sample. In the case that the liquid separation medium is already located inside the porous scaffold material, the sample can be injected into the liquid separation medium.

The location or positioning of the sample can be freely chosen by the user. The sample can be located anywhere within the migration path formed by the liquid separation medium between the anode and the cathode or within the reservoirs if existing.

The application of a voltage between the anode and the cathode within the liquid separation medium, induces the migration and eventually separation of the components comprised in the sample. The separation of the components can occur due to their size, molecular weight, molecular structure, charge, and/or isoelectric point (pI, pH(I), IEP).

In a preferred embodiment of the present invention, the sample is applied through semi-contact writing or non-contact dispensing or contact dispensing. "Applying a sample" in the sense of the present invention can relate to the application of the sample to the surface of the scaffold material or the injection of the sample into the separation medium.

According to a preferred embodiment of the present invention, the sample comprises biomolecules preferably selected from the group comprising DNA, RNA, proteins, lipids, carbohydrates and combinations thereof.

In a preferred embodiment of the invention, the sample volume is about 1 pl to 1000 nl, preferably about 10 pl to 100 nl, more preferably about 100 pl to 10 nl, most preferably about 1 nl.

The range of about 1 pl to 1000 nl is particularly advantageous because it relates to small sample volumes resulting in a high separation resolution.

The range of about 10 pl to 100 nl is even more preferred since in addition to the advantage of high separation resolution a smaller maximum volume is required resulting in a more efficient use of the sample material.

The sample volume range of about 100 pl to 10 nl is particularly preferred because in addition to the above advantages it enables an exact dosage of the sample volume while the maximum volume is still small enough to allow the use of very thin migration paths that can still accommodate the sample without deformation of the geometrical shape of the liquid separation medium. Furthermore, this sample volume enables a high sensitivity or detection of the sample components, while the separation accuracy is very high.

A sample volume of about 1 nl represents is most preferred in the context of the present invention because due to the small volume of the sample the amounts of all other materials involved in the method of the present invention can be reduced.

In a preferred embodiment of the present invention one or more biomolecules are visualized and/or quantified during migration. Visualization and/or quantification of biomolecules during migration can be performed by means of laser-induced fluorescence. Therefore, in the context of this embodiment the biomolecules to be detected should be fluorescently labeled. This can be achieved by coupling a biomolecule to a fluorophore.

Fluorophores (or fluorochromes) that can be used in the context of the present invention are fluorescent chemical compounds that can re-emit light upon light excitation. Fluorophores for use as labels in constructing labeled biomolecules of the invention comprise, without claiming to be exhaustive, rhodamine and derivatives, such as Texas Red, fluorescein and derivatives, such as 5-bromomethyl fluorescein, Lucifer Yellow, IAEDANS, 7-Me2N-coumarin-4-acetate, 7-OH-4-CH3-coumarin-3-acetate, 7-NH2-4CH3-coumarin-3-acetate (AMCA), monobromobimane, pyrene trisulfonates, such as Cascade Blue, and monobromotrimethyl-ammoniobimane, FAM, TET, CAL Fluor Gold 540, HEX, JOE, VIC, CAL Fluor Orange 560, Cy3, NED, Quasar 570, Oyster 556, TMR, CAL Fluor Red 590, ROX, LC red 610, CAL Fluor Red 610, Texas red, LC red 610, CAL Fluor Red 610, LC red 640, CAL Fluor Red 635, Cy5, LC red 670, Quasar 670, Oyster 645, LC red 705, Cy5.5, BODIPY FL, Oregon Green 488, Rhodamine Green, Oregon Green 514, Cal Gold, BODIPY R6Gj, Yakima Yellow, JOE, HEX, Cal Orange, BODIPY TMR-X, Quasar-570/Cy3, TAMRA, Rhodamine Red-X, Rhodamine B, Rhodamine 6G, Redmond Red, BODIPY 581/591, Cy3.5, Cal Red/Texas Red, BODIPY TR-X, BODIPY 630/665-X, Pulsar-650, Quasar-670/Cy5.

Alternatively, the biomolecules of the present invention can be intrinsically fluorescent, for example fluorescent protein. In another preferred embodiment, fluorescent biomolecules can be linked to the biomolecule to be detected. Non-limiting examples of fluorescent proteins that may be used in the context of the invention include, photoproteins, such as aequorin; obelin; Aequorea fluorescent proteins, such, e.g., green fluorescent proteins (GFP, EGFP, AcGFP1), cyan fluorescent proteins (CFP, ECFP), blue fluorescent proteins (BFP, EBFP), red fluorescent proteins (RFP), yellow fluorescent proteins (YFP, EYFP), ultraviolet fluorescent protein (GFPuv), their fluorescence-enhancement variants, their peptide destabilization variants, and the like; coral reef fluorescent proteins, such, e.g., Discosoma red fluorescent proteins (DsRed, DsRed1, DsRed2, and DsRed-Express), Anemonia red fluorescent proteins (AsRed and AsRed2), Heteractis far-red fluorescent proteins (HcRed, HcRed1), Anemonia cyan fluorescent proteins (AmCyan, AmCyan1), Zoanthus green fluorescent proteins (ZsGreen, ZsGreen1), Zoanthus yellow fluorescent proteins (ZsYellow, ZsYellow1), their fluorescence-enhancement variants, their peptide destabilization variants, and the like; Renilla reniformis green fluorescent protein (Vitality hrGFP), its fluorescence-enhancement variants, its peptide destabilization variants, and the like; and Great Star Coral fluorescent proteins, such, e.g., Montastrea cavernosa fluorescent protein (Monster Green® Fluorescent Protein), its fluorescence-enhancement variants, its peptide destabilization variants, and the like. One skilled in the art understands that these and a variety of other fluorescent proteins can be useful as a fluorescent protein in aspects of the invention, see, e.g., Jennifer Lippincott-Schwartz & George H. Patterson, Development and Use of Fluorescent Protein Markers in Living Cells, 300(5616) Science 87-91 (2003); and Jin Zhang et al., 3(12) Nat. Rev. Mol. Cell. Biol. 906-918 (2002). One skilled in the art understands that these and many other fluorescent proteins, including species orthologs and paralogs of the above described naturally occurring fluorescent proteins as well as engineered fluorescent proteins can be useful as a fluorescent protein disclosed in aspects of the present specification.

In another preferred embodiment of the present invention intercalating fluorescent dyes can be used to detect nucleic acid molecules. In particular such dyes include but are not limited to ethidium bromide, propidium iodide, Hoechst 33258, Hoechst 33342, acridine orange, ethidium bromide homodimers, EverGreen, and all dyes of the SYBR and SYTO families. Such dyes also include POPO, BOBO, YOYO and TOTO from Molecular Probes (Eugene, Oreg.).

In a preferred embodiment of the method of the present invention the biomolecules are immobilized on the porous scaffold material or the separation medium upon application of a binding stimulus. In the context of the present invention, binding stimuli comprise, without limitation, heat, UV- (ultraviolet), IR- (infrared) or any other optical radiation, electrostatic interaction, biological binding, magnetic interactions, adhesion and chemical modifications through activation of chemical reactions. It is a specific advantage of the method of the present invention that specific binding of biomolecules to the separation medium or the scaffold material can be induced by specific stimuli. Surprisingly, this feature allows separation of the biomolecules while they are in contact with the scaffold material and the separation medium and binding only occurs upon application of a stimulus or stimulus is suppressed or overcome by the force applied to let the biomolecules migrate through the separation medium. Therefore, in the context of the present invention the transfer step of conventional blotting procedures can be superfluous, since the biomolecules can migrate while they are in contact with the membrane.

According to a preferred embodiment of the present invention the biomolecules are detected by means of detection, preferably selected from the group comprising fluorescent labels, nucleic acid probes, antibodies, aptamers and molecules that specifically bind to the biomolecule to be detected. The various means of detection can comprise specific labels, such as for example, without limitation, fluorescent labels, luminescent labels, specific reactive chemical groups, gold-, silver-, magnetic-, metal oxide-particles, beads containing marker particles, non-fluorescent dyes or radioactive labels.

In another preferred embodiment of the present invention biomolecules are detected during migration via ultraviolet (UV-) absorption detection without the need of any label. Furthermore the biomolecules can be label-free detected during migration electrochemically via impedance detection requiring a specific measurement-electrode-setup that can be implemented in the base substrate for example.

In a preferred embodiment of the present invention this detection step can be performed after the biomolecules have bound to the scaffold material. In that case it is possible to wash off the liquid separation medium and/or other substances that have been in contact with the scaffold material to achieve a more efficient detection of the biomolecules that have bound to the scaffold material.

In a preferred embodiment of the present invention the means of detection can be injected into the liquid separation medium at the same position where the sample had been injected before, after the sample components have been separated and the biomolecules have bound to the scaffold material. In this context, upon application of a voltage to the liquid separation medium, the means of detection subsequently migrate along the separation channel and specifically bind to the biomolecules to be detected when reaching the position where the biomolecules have bound to the scaffold material. Alternatively, the means of detection can be applied and bound to the scaffold material prior to application and separation of the biomolecule containing sample. The biomolecules will subsequently bind to the means of detection when migrating past the position where the means of detection are bound to the scaffold material.

In a preferred embodiment of the present invention one or more samples can be applied to the same or multiple independent geometrical shapes located inside the porous scaffold material for parallel analysis. For example, several separation channels of liquid separation medium can be applied as parallel lines next to each other within the porous scaffold material and different samples can be analyzed in parallel in the different separation channels. Alternatively, also the same sample could be analyzed in different separation channels of the same geometry, to have a technical replicate of the analysis, or to analyze the same sample with different means of detection in different separation channels. In another embodiment of the invention the same sample could be analyzed in different separation channels of a different geometrical shape.

The small scale of the present invention makes it possible to apply, for example, 50 parallel separation channels of liquid separation medium with a width of 200 µm and a 200 µm gap between the channels to a membrane with a width of 2 cm, allowing to perform 50 experiments in parallel on a single membrane. This example illustrates the possibilities and the flexibility of the method of the present invention.

In another preferred embodiment of the present invention the separation medium is at least partially covered by a non-miscible fluid to prevent evaporation. Non-miscible fluids comprise oil, silicone or fluorocarbon oils. In another embodiment of the invention, the separation medium can also be covered by a lid or foil, and/or the device of the invention can be cooled to avoid evaporation of the liquids.

The person skilled in the art knows that the features, properties and advantages recited above for the electrophoretic separation device of the present invention and the method of manufacturing such a device equally apply to the method of electrophoretic separation of the present invention. It is obvious that the preferred features of the device and the method of manufacturing the device can be integrated into the method of electrophoretic separation of the invention, since the method makes use of the device.

For example, it is obvious that in one embodiment of the method of electrophoretic separation, the separation medium can be a liquid or solid polyacrylamide based gel that forms fluid reservoirs at the contact points with the anode and the cathode, forms a separation channel having a width of 25 to 2000 µm, and is applied onto the surface of the porous scaffold material through semi-contact writing. Accordingly, all features and advantages of the device and the method of manufacturing the device have also been disclosed in the context of the method of electrophoretic separation.

The other way around, features that have been disclosed in the context of the method of electrophoretic separation also apply to the device for electrophoretic separation and the method of manufacturing such a device.

DETAILED DESCRIPTION OF THE INVENTION

The invention is further described by the following figures. These are not intended to limit the scope of the invention, but represent preferred embodiments of aspects of the invention provided for greater illustration of the invention described herein.

DETAILED DESCRIPTION OF THE FIGURES

Figure 1:
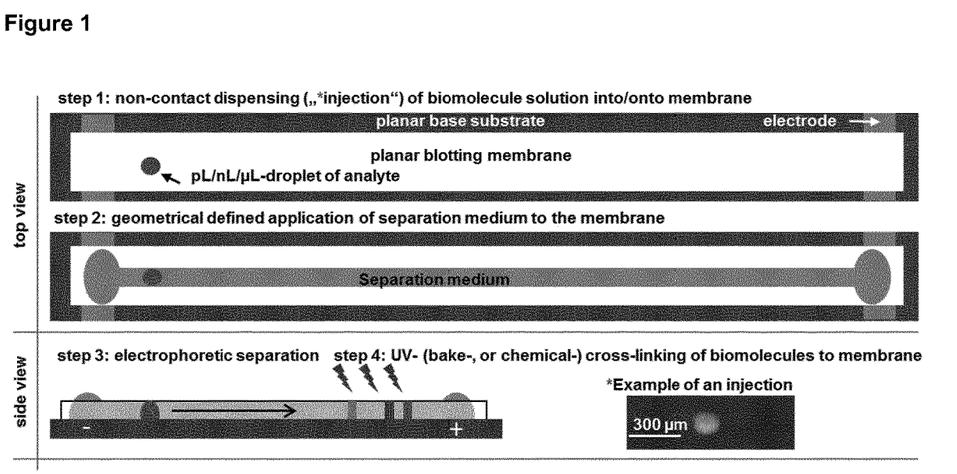
FIG. 1: Schematic representation of the method of the invention. Note that step 1 and 2 can be interchanged

FIG. 1 shows a schematic representation of a preferred embodiment of the device and method of the invention. The panel on the lower right shows an example injection by applying a single droplet with a non-contact dispenser into a nitrocellulose membrane. 150 pL of a DNA solution containing fragments of the same length (28-bp; 100 µM, dye: Rhodamin 6G) were dosed. In this process, steps 1 & 2 can also be interchanged, so that the sample is injected directly into the separation medium within the membrane.

Figure 2:
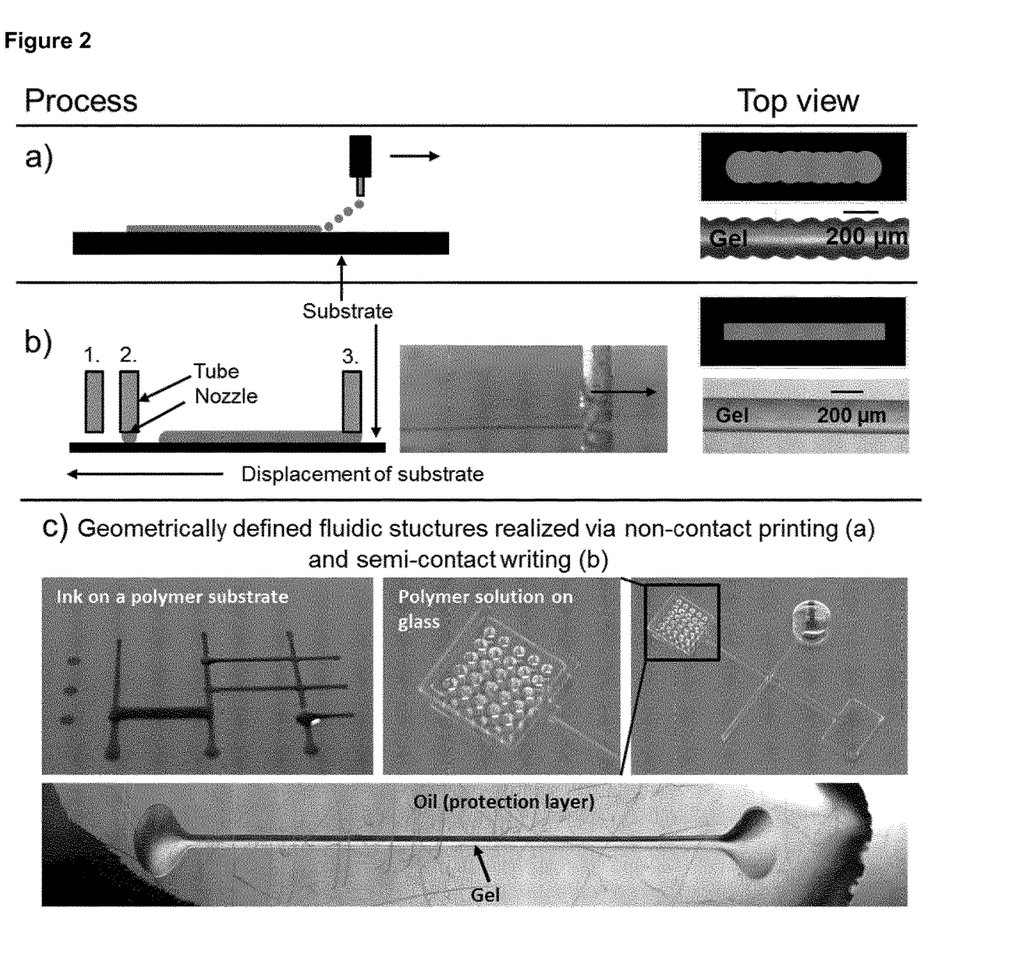
FIG. 2: Presentation of possible application methods for the generation of geometrically defined structures of liquid separation medium on a porous membrane. Geometrically defined structures realizable via non-contact dispensing and semi-contact writing on planar substrates.

FIG. 2 shows two possible methods for applying the liquid separation medium onto the porous scaffold material, in this case a membrane. a) shows the successive dosing of single drops with simultaneous movement of the dosing device for the generation of the structure on a membrane. b) shows the so-called "semi-contact writing" method. A nozzle is moved close to the membrane and a capillary bridge is formed between the substrate and the nozzle. Due to the capillary flow, a fluidic line can be generated, for example, by the controlled movement of the substrate or of the nozzle. c) shows geometrically defined structures like dots, squares, crossing T-structures realizable via non-contact dispensing and semi-contact writing on planar substrates. The section at the bottom shows an electrophoretic separation system on a planar substrate comprising a separation channel made out of a linear polyacrylamide-based gel with two reservoirs for the electrical contacting to anode and cathode and an oil cover as evaporation protection. This system can be transferred into a membrane as described here.

Figure 3:
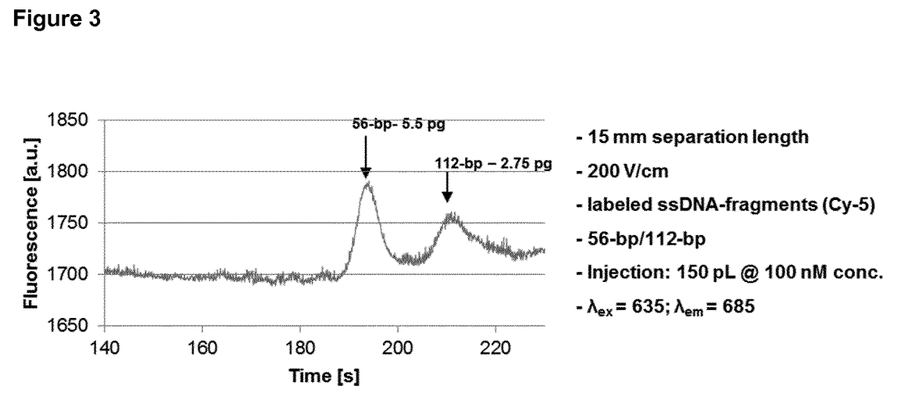
FIG. 3: Separation of 2 DNA fragments in a polyacrylamide-based gel within a nitrocellulose membrane.

FIG. 3 shows the separation of 2 DNA fragments in a polyacrylamide-based gel within a membrane (nitrocellulose, 125 µm thick). The fragments were spot-detected by laser-induced fluorescence near the positive electrode.

Figure 4:
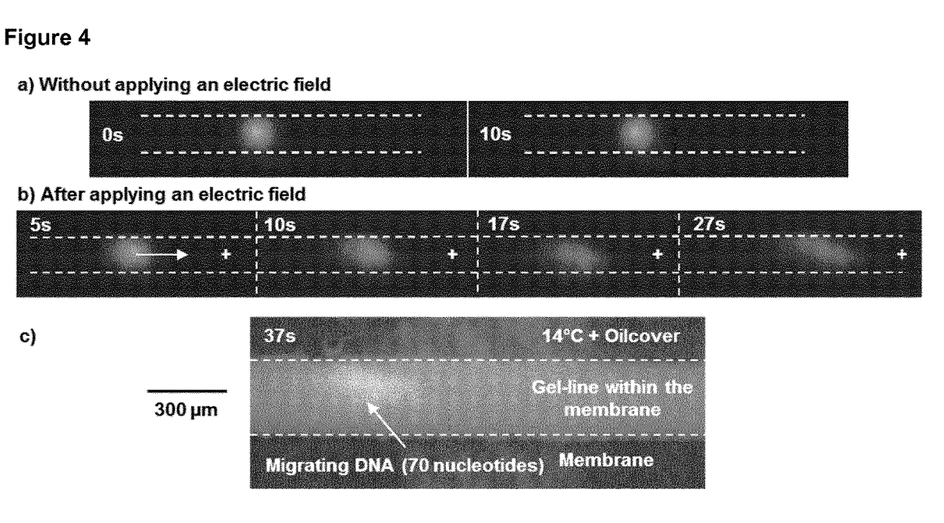
FIG. 4: Real-time observation of the migration of DNA fragments.

FIG. 4 shows the real-time observation of the migration of DNA fragments of equal length (28 bp, rhodamine 6G, $\lambda_{em}$=555 nm). A laser with line optics ($\lambda_{ex}$=532 nm) was used to illuminate the entire line and a CCD camera with a high-pass filter ($\lambda_{cutoff}$=550 nm) for detecting the emitted light.

EXAMPLES

The invention is further described by the following examples. These are not intended to limit the scope of the invention, but represent preferred embodiments of aspects of the invention provided for greater illustration of the invention described herein.

Example 1

A planar substrate with flat electrodes is used as the base material. A porous membrane is placed on this substrate across the electrodes (anode and cathode). In the first process step, a 1 nl drop of the sample is applied by a non-contact method to the membrane.

In the second process step, the separation medium is applied to the membrane in a defined geometrical shape so that the previously applied sample is located within the geometry of the separation medium. The medium is applied in form of a line to generate a separation channel. For connecting the separation channel with the anode and the cathode, the separation medium is applied to the electrode contact points onto the membrane in form of reservoirs. Due to the membrane pores, the medium is drawn into the membrane through capillary forces. In this way, not only the liquid separation channel is generated within the membrane but also the contact points to the electrodes located on the base substrate are generated. In order to exploit the advantages on the micrometer scale, the separation channel has a width of 200 µm. The system is cooled and completely covered with oil for evaporation protection.

In the third step, a voltage is applied via the electrodes, whereby an electric field forms along the geometry of the separation medium and initiates the migration of the biomolecules within the medium. After separation of the biomolecules, which are visualized and simultaneously quantified by laser-induced fluorescence methods during the process, the biomolecules are bound to the membrane by UV exposure. Subsequently, the separation medium and oil are washed off the membrane and the membrane is analyzed by means of detection of biomolecules. This method is schematically depicted in FIG. 1.

Example 2

The application of the separation medium to the porous scaffold material can be carried out in various ways. In principle, any conceivable possibility or combination of methods can be used for this purpose. FIG. 2 shows two possible methods for selective application of the separation medium. a) shows the successive dosing of single drops with simultaneous movement of the dosing device for the generation of the structure on the porous membrane. b) shows the so-called "semi-contact writing" method. A nozzle is moved close to a porous membrane and a capillary bridge is formed between the substrate and the nozzle. Due to the capillary flow, a fluidic line can be generated, for example, by the controlled movement of the substrate or of the nozzle.

Example 3

FIG. 3 shows the result of the first separation of two DNA fragments of different lengths (56 & 112 bp; Cy5; 150 pL @ 100 nM concentration) using the previously described method. A nitrocellulose membrane (0.2 µm pore size) was used. The separation channel, consisting of a polyacrylamide based polymer solution, had a width of 250 µm. Corresponding to the membrane thickness of 125 μm, the cross-section of the separation channel was 250×125 μm². The preparation of the separation channel in the membrane together with injection and covering with oil took 2 minutes. As shown in the diagram, the separation (in this case) takes 3-4 minutes. Accordingly, the total time to prepare the electrophoretic device and carry out the experiment was 5-6 minutes. Subsequent immobilization of the DNA to the membrane by UV exposure took 60 seconds.

Example 4

FIG. 4 shows the migration of fragments of the same length (28 bp, tagged with Rhodamine 6G) in real time. For detection, the separation channel within the membrane was completely illuminated with a laser with line optics ($\lambda_{ex}$=532 nm). In addition, a high-pass filter was installed in front of a conventional CCD camera ($\lambda_{cutoff}$=550 nm). During the application of an electric field of 200 V/cm, the migration process was recorded to demonstrate its applicability. A sample volume of 1.5 nL and a concentration of 100 μM DNA was used for visualization (comparison to the highly sensitive detection in Example 3 (FIG. 3): 10×larger volume, 1000×higher concentration). It can be seen from FIG. 3 a) that no migration can be detected without applying an electric field. In FIG. 3 b), the electric field was applied. The migration was recorded at different times. Since the camera, which was attached to the 3-axis system, was moved with the migrating sample, the migration distances cannot be read from the images (indicated by the dashed lines). In FIG. 4 c), a 10 W LED was added in addition to the laser to visualize the gel line (separation channel) within the membrane. The high-pass filter in front of the CCD camera accordingly allows several wavelengths above 550 nm to pass the filter. This way a defined section of the gel line within the membrane can be seen.

What is claimed is:

1. An electrophoretic separation device, comprising
   an anode and a cathode,
   a porous scaffold material, and
   a liquid separation medium, wherein the separation medium
      is located inside the porous scaffold material,
      is in contact with the cathode and the anode, and
      forms a custom-made geometrical shape that only fills parts of the porous scaffold material and forms a channel with a width of 25 to 1000 μm defining a migration path for a sample, wherein the sample is enclosed by the separation medium.

2. The device according to claim 1, wherein the liquid separation medium is a liquid or a gel, selected from the group consisting of: liquid or solid polyacrylamide based gels, agarose based gels, hydrogels, gradient gels and buffer solutions.

3. The device according to claim 1, wherein the channel has a width of 30 to 500 μm.

4. The device according to claim 1, wherein the separation medium forms fluid reservoirs at the contact with the anode and the cathode.

5. The device according to claim 1, wherein the geometrical shape of the separation medium forms complex structures.

6. The device according to claim 1, wherein the porous scaffold material either has a pore diameter of 0.05 to 1 μm, has a planar shape, has a thickness of 10 to 1000 μm, or a combination thereof.

7. The device according to claim 1, wherein the porous scaffold material or the separation medium exhibits a binding capacity for the sample or components of the sample.

8. The device according to claim 1, wherein the binding capacity is activated upon application of a binding stimulus.

9. The device according to claim 1, wherein the porous scaffold material is PVDF, nylon or nitrocellulose.

10. The device according to claim 1, wherein the porous scaffold material is placed on a base substrate comprising the anode and the cathode or wherein the porous scaffold material comprises the anode and the cathode.

11. A method of manufacturing an electrophoretic separation device according to claim 1, wherein the separation medium is applied onto the surface of the porous scaffold material in a geometrical shape defining a migration path for a sample and penetrates the porous scaffold material.

12. The method of manufacturing a device according to claim 11, wherein the separation medium is applied onto the surface of the porous scaffold material through semi-contact writing, non-contact dispensing or contact dispensing.

13. A method for electrophoretic separation of biomolecules, comprising
   providing an electrophoretic separation device, comprising
      an anode and a cathode,
      a porous scaffold material, and
      a liquid separation medium, wherein the separation medium
         is located inside the porous scaffold material,
         is in contact with the cathode and the anode, and
         has been applied to the porous scaffold material in form of a custom-made geometrical shape that only fills parts of the porous scaffold material and forms a channel with a width of 25 to 1000 μm defining a migration path for a sample, wherein the sample is enclosed by the separation medium, and
      a biomolecule-containing sample, wherein
         the sample is applied to the porous scaffold material prior to the application of the separation medium, or
         the sample is applied to the separation medium located inside the porous scaffold material, resulting in enclosure of the sample by the separation medium, wherein the location of the sample within the geometrical shape of the separation medium can be freely chosen,
      applying a voltage to the separation medium by means of the anode and the cathode leading to the migration of the biomolecules inside the separation medium.

14. The method for separation of biomolecules according to claim 13, wherein the sample is applied through semi-contact writing or non-contact dispensing or contact dispensing or the sample volume is 1 pl to 1000 nl, or a combination thereof.

15. The method for separation of biomolecules according to claim 13, wherein the sample comprises biomolecules selected from the group consisting of: DNA, RNA, proteins, lipids, carbohydrates and combinations thereof.

16. The method for separation of biomolecules according to claim 13, wherein one or more biomolecules are visualized or quantified during migration or a combination thereof.

17. The method for separation of biomolecules according to claim 13, wherein the biomolecules are immobilized on the porous scaffold material or the separation medium upon application of a binding stimulus.

18. The method for separation of biomolecules according to claim 13, wherein the biomolecules are detected by means of detection selected from the group consisting of: fluorescent labels, nucleic acid probes, antibodies, aptamers and molecules that specifically bind to the biomolecule to be detected.

19. The method for separation of biomolecules according to claim 13, wherein one or more samples can be applied to the same or multiple independent geometrical shapes located inside the porous scaffold material for parallel analysis.

20. The method for separation of biomolecules according to claim 13, wherein the separation medium is at least partially covered by a non-miscible fluid to prevent evaporation of the separation medium.

\* \* \* \* \*